US006020054A

United States Patent [19]

Masuda et al.

[11] Patent Number: 6,020,054

[45] Date of Patent: Feb. 1, 2000

[54] CHARGING MEMBER AND DEVICE

[75] Inventors: Yoshitomo Masuda, Hamura; Yasushi Inoue, Kodaira; Shigeru Kijima, Tokorozawa, all of Japan

[73] Assignee: Bridgestone Corporation, Tokyo, Japan

[21] Appl. No.: 08/871,531

[22] Filed: Jun. 9, 1997

Related U.S. Application Data

[63] Continuation-in-part of application No. 08/714,328, Sep. 18, 1996, abandoned.

[30] Foreign Application Priority Data

| | | | |
|---|---|---|---|
| Sep. 19, 1995 | [JP] | Japan | 7-240203 |
| Oct. 19, 1995 | [JP] | Japan | 7-271436 |
| Dec. 13, 1995 | [JP] | Japan | 7-324912 |
| Oct. 11, 1996 | [JP] | Japan | 8-269922 |

[51] Int. Cl.[7] .......................... B32B 27/08; B32B 27/20; G03G 15/02

[52] U.S. Cl. .................................... 428/319.3; 428/319.7; 428/323; 428/421; 428/422; 428/906; 361/221; 361/225; 399/176; 430/902; 492/53; 492/56

[58] Field of Search ................................ 428/36.4, 36.5, 428/319.3, 319.7, 421, 422, 458, 461, 323, 906; 361/221, 225; 399/168, 176; 430/902; 492/53, 56

[56] References Cited

U.S. PATENT DOCUMENTS

| | | | |
|---|---|---|---|
| 5,288,583 | 2/1994 | Osumi et al. | 430/126 |
| 5,359,395 | 10/1994 | Shimura et al. | 355/219 |
| 5,576,810 | 11/1996 | Aita et al. | 355/228 |
| 5,608,500 | 3/1997 | Funabashi et al. | 399/176 |
| 5,705,274 | 1/1998 | Inoue et al. | 428/411.1 |

*Primary Examiner*—Blaine Copenheaver
*Attorney, Agent, or Firm*—Sughrue, Mion, Zinn, Macpeak & Seas, PLLC

[57] ABSTRACT

The invention provides a charging roller for electrically charging a photoconductor by placing the roller in contact with the photoconductor and applying voltage between them. The roller has an elastic shaft and an outermost layer of less than 30 $\mu$m thick containing an aqueous fluorocarbon resin. The charging roller is effective for providing a constant supply of electric charge to the photoconductor and preventing residual toner from depositing onto the roller.

26 Claims, No Drawings

CHARGING MEMBER AND DEVICE

CROSS REFERENCE TO RELATED APPLICATION

This application is a continuation-in-part of application Ser. No. 08/714,328 filed on Sep. 18, 1996, now abandoned, the entire contents of which are hereby incorporated by reference.

BACKGROUND OF THE INVENTION

1. Field of the Invention

This invention relates to a charging member and device for imparting electrical charge to an object, typically a photoconductor drum for use in an electrostatic latent image forming process, for example, copiers and printers.

2. Prior Art

The conventional electrophotography as applied to copiers and printers involves the steps of uniformly charging a photoconductor on the surface, projecting an image from an optical system onto the photoconductor to form a latent image in an exposed area where the electric charge is erased, applying toner to the photoconductor to form a toner image, and transferring the toner image to a record medium, typically paper.

The first step of electrically charging the photoconductor typically employs a corona discharge system. The corona discharge system, however, is undesirable from the standpoint of safety and maintenance of the machine since it requires application of as high voltage as 6 to 10 kV. It also suffers from an environmental problem due to the emission of harmful substances such as ozone during corona discharge. There is a need for an alternate charging system capable of charging at a lower applied voltage than the corona discharge and minimizing emission of ozone and other harmful substances.

One exemplary alternative charging system is a contact charging system wherein a charging member having voltage applied thereto is brought in contact with an object to be charged such as a photoconductor, thereby charging the object. Known charging members for use in the contact charging system include rollers which are based on rubber, urethane foam or the like and covered with a resin layer of polyurethane, nylon or the like.

These prior art charging members, however, have the following drawbacks. (1) When a resin layer is formed on an elastic layer of foam by dissolving a resin such as polyurethane and nylon in an organic solvent and applying the solution by dipping or spraying, the foam of the elastic layer can be swollen with the organic solvent to induce irregularities on the surface. The organic solvent which has penetrated into the foam will blow off the coating upon drying, forming crater-like holes in the coating surface. The charging member thus loses surface smoothness, failing to provide a uniform supply of electric charge from the charging member to the object. (2) Resins such as polyurethane and nylon tend to receive toner residues which are left on the photoconductor without being transferred. Then the toner residues adhere to the charging member, eventually leading to defective images.

The problems of surface smoothness and residual toner may be somewhat overcome by forming an elastic layer from an elastic material other than foam. In this case, however, the charging member has increased hardness, failing to provide an appropriate nip width between the member and the object to be charged to maintain a desirable physical contact therebetween.

Also, prior art charging members are not necessarily satisfactory in charging ability and durability. For improving charging ability and durability, it is necessary to achieve a uniform supply of electric charge from a charging member to an object to be charged. To this end, it is crucial to achieve a more uniform electrical state or resistance of the charging member and a more uniform physical contact between the charging member and the object.

Although the uniformity of resistance can be accomplished by improving the dispersion of conductive substance, such an improvement is difficult in practice. The reason is that the resistance region frequently chosen for charging members is not a good conductor region where conductive substance forms a definite conductive path, but a semiconductive region. Of course, it is contemplated to improve the dispersion of conductive substance and hence, the uniformity of resistance by adding a dispersant. The use of such additives as dispersants, however, is not recommended because they give rise to problems of migration and contamination to the object to be charged.

It is thus difficult to improve the charging performance and durability of a charging member while satisfying both the electrical uniformity thereof and the uniformity of physical contact thereof with an object to be charged.

SUMMARY OF THE INVENTION

The present invention aims to provide a charging member for electrically charging an object in an electrophotographic process of forming a latent image in copiers and printers, the charging member having improved charging performance and durability in that it assists in forming a satisfactory latent image by satisfying both the electrical uniformity of the charging member and the uniformity of physical contact of the charging member with the object and it prevents adhesion of residual toner. The present invention also aims to provide a charging device comprising the charging member.

Regarding a charging member for electrically charging an object by placing the member in contact with the object and applying voltage between them, we have found that by forming a resin layer containing an aqueous fluorocarbon resin on the outer surface of the charging member, it is possible to provide a uniform supply of electric charge to the object and prevent the adhesion of residual toner to the charging member.

The charging member of the invention is effective for preventing residual toner from depositing and adhering to the charging member since its outermost layer is formed of a resin containing a fluorocarbon resin. Since the fluorocarbon resin used is an aqueous one, water can be used as a solvent. Then even when an elastic layer is made of a foam, water solvent does not cause the irregular foam surface to be swollen. This permits the charging member to maintain a smooth surface, rendering more uniform the physical contact of the charging member with the object to be charged, thereby improving charging performance and durability.

When carbon having an oxygen content of 6% or more and pH 5 or higher is added as a conductive agent to the resin containing an aqueous fluorocarbon resin of which the outermost layer is made, it is possible to impart uniform conductivity in a region suitable as a charging member to the outermost layer. When a polyvinyl acetal resin, urethane resin, polyester resin, acrylic resin, and/or nylon resin is blended in the resin of the outermost layer, the resulting blend can be uniformly mixed even when the content of aqueous fluorocarbon resin exceeds 60% by weight. This is also effective for satisfying both the electrical uniformity of the charging member and the uniformity of physical contact of the charging member with the object, leading to further improvements in charging performance and anti-adhesion of toner.

When an isocyanate resin, melamine resin, phenol resin, glyoxal, and/or epoxy resin is further blended in the outermost layer-forming resin composition, the resins other than the aqueous fluorocarbon resin can be crosslinked to increase strength. This leads to an improvement in durability.

Accordingly, the present invention in one aspect provides a charging member for electrically charging an object by placing the member in contact with the object and applying voltage between them, the member comprising an outermost layer containing an aqueous fluorocarbon resin.

In preferred embodiments, the outermost layer further contains carbon having an oxygen content of 6% or more and pH 5 or higher; the outermost layer further contains at least one second resin selected from the group consisting of a polyvinyl acetal resin, urethane resin, polyester resin, acrylic resin, and nylon resin; and the outermost layer resins other than the aqueous fluorocarbon resin are crosslinked by addition of at least one third resin selected from the group consisting of an isocyanate resin, melamine resin, phenol resin, glyoxal, and epoxy resin.

In another aspect, the present invention provides a device for electrically charging an object, comprising a charging member adapted to be placed in contact with the object and means for applying voltage between the member and the object for electrically charging the object, the charging member being as defined above.

DETAILED DESCRIPTION OF THE INVENTION

As briefly described above, the present invention pertains to a device for electrically charging an object, comprising a charging member adapted to be placed in contact with the object and means for applying voltage between the member and the object for electrically charging the object. The charging member of the invention has an outermost layer formed of a resin composition comprising an aqueous fluorocarbon resin.

Since the charging member of the invention is adapted to electrically charge an object in a contact charging mode, the charging member may have any desired shape insofar as it can contact the object. A choice may be made among various shapes including roll, blade and block shapes, with the roll shape being preferred. The roll-shaped charging member typically includes a metallic or resinous shaft extending along its central axis.

The construction of the charging member according to the invention is not critical insofar as the outermost layer is formed of a resin composition comprising an aqueous fluorocarbon resin. Depending on a particular purpose, an elastic layer may be provided inside the outermost layer and one or more intermediate layer may be provided between the elastic layer and the outermost layer.

The elastic layer may be formed of rubber, resins or expanded products thereof (simply referred to as "foam") although the elastic layer most often takes the form of a foam shaft. It is preferably formed of foam, especially urethane foam. The foam preferably has a density of 0.05 to 0.9 g/cm$^3$.

A conductive substance may be added to the foam for imparting a desired resistance thereto. Examples of the conductive substance include cationic surfactants, for example, quaternary ammonium salts such as perchlorate salts, chlorate salts, borofluorate salts, sulfate salts, ethosulfate salts, benzyl halide salts (e.g., benzyl bromide and benzyl chloride salts) of lauryl trimethyl ammonium, stearyl trimethyl ammonium, octadodecyl trimethyl ammonium, dodecyl trimethyl ammonium, hexadecyl trimethyl ammonium, and modified fatty acid-dimethylethyl ammonium; anionic surfactants such as aliphatic sulfonate salts, higher alcohol sulfate ester salts, higher alcohol ethylene oxide addition sulfate ester salts, higher alcohol phosphate ester salts, and higher alcohol ethylene oxide addition phosphate ester salts; ampholytic surfactants such as various betaines; antistatic agents including nonionic antistatic agents, for example, higher alcohol ethylene oxides, polyethylene glycol fatty acid esters, polyhydric alcohol fatty acid esters, salts of Group 1 metals in the Periodic Table such as $Li^+$, $Na^+$ and $K^+$, e.g., $LiCF_3SO_3$, $NaClO_4$, $LiAsF_6$, $LiBF_4$, NaSCN, KSCN, NaCl, etc., electrolytes such as $NH_4^+$ salts, salts of Group 2 metals in the Periodic Table such as $Ca^{++}$ and $Ba^{++}$, e.g., $Ca(ClO_4)_2$, and modified ones of these antistatic agents having a group bearing at least one active hydrogen reactive with isocyanate such as a hydroxyl, carboxyl or primary or secondary amine group, and ionic conductors like complexes thereof with polyhydric alcohols such as 1,4-butane diol, ethylene glycol, polyethylene glycol, propylene glycol and polyethylene glycol or derivatives thereof and complexes thereof with monools such as ethylene glycol monomethyl ether and ethylene glycol monoethyl ether; conductive carbon such as Ketjen black EC and acetylene black; rubber carbon such as SAF, ISAF, HAF, FEF, GPF, SRF, FT, and MT; oxidation treated carbon for color ink, pyrolytic carbon, natural graphite, and synthetic graphite; metals and metal oxides such as antimony-doped tin oxide, titanium oxide, zinc oxide, nickel, copper, silver, and germanium; and conductive polymers such as polyaniline, polypyrrole, and polyacetylene.

According to the invention, the outermost layer is made of a resin composition comprising an aqueous fluorocarbon resin. The aqueous fluorocarbon resin used herein includes polytetrafluoroethylene, tetrafluoroethylene-perfluoroalkyl vinyl ether copolymers, tetrafluoroethylene-hexafluoropropylene-perfluoroalkyl vinyl ether copolymers, tetrafluoroethylene-ethylene copolymers, polychlorotrifluoroethylene, chlorotrifluoroethylene-ethylene copolymers, polyvinylidene fluoride, and polyvinyl fluoride. The aqueous fluorocarbon resin used herein may be of any type, for example, water-soluble type, emulsion type, and suspension type insofar as the solvent is water. A dispersion of microparticulate polytetrafluoroethylene in water, of which microparticule size is about 0.01 to about 100 $\mu$m should preferably be used.

In the resin composition of which the outermost layer is made, the content of aqueous fluorocarbon resin is not critical although the aqueous fluorocarbon resin preferably occupies more than 60% by weight of the resin component. More preferably, the aqueous fluorocarbon resin occupies at least 70%, especially at least 80%, most preferably at least 90% by weight of the resin component.

Another (or second) resin is often blended with the aqueous fluorocarbon resin. Examples of the other resin include polyvinyl acetal resins, vinylidene chloride copolymer latices, urethane resins, polyester resins, acrylic resins, and nylon resins alone or in admixture of two or more. Among others, polyvinyl acetal resins, urethane resins, and polyester resins, especially polyvinyl acetal resins are preferred from the standpoints of easy coating of fluorocarbon resin and the uniformity of resistance. More particularly, a blend of an aqueous fluorocarbon resin and an aqueous polyvinyl acetal resin is easy to form a uniform coating even when the blend contains a large proportion of the aqueous fluorocarbon resin. This resin blend is preferably used in an amount of 0.1 to 40%, especially 0.1 to 20% by weight of the resin component.

In addition to the aqueous fluorocarbon resin and second resin, the resin composition of which the outermost layer is made may contain a third resin which is selected from the group consisting of an isocyanate resin, melamine resin, phenol resin, glyoxal, and epoxy resin and mixtures thereof. The third resin will crosslink with the second resin(s) other than the fluoro-resin to increase strength. It is preferred to use a polyisocyanate which can be emulsified in water. The amount of the third resin used is preferably 5 to 40% by weight of the second resin. The term “resin component” is thus the sum of aqueous fluorocarbon resin, second resin and third resin although the latter two are optional.

For adjusting conductivity, a conductive agent may be added to the resin composition of the outermost layer. Any desired conductive agent may be used although carbon is preferred. It is desirable to use carbon having an oxygen content of at least 6%, more preferably at least 7%, most preferably at least 9% and at pH 5 or higher, more preferably pH 6 or higher, most preferably pH 7 or higher. In general, carbon has an oxygen content of about 0.1 to 3%. It seems that carbon is more dispersible as its oxygen content increases. Oxidation treated carbon is known. The oxidation treatment is effective for increasing the oxygen content of carbon, but shifts its pH toward the acidic side. If carbon having a pH value shifted toward the acidic side is added to an aqueous fluorocarbon resin, it causes a loss of stability. In order that carbon be effectively dispersed and stably blended in an outermost layer-forming composition comprising an aqueous fluorocarbon resin, it is preferred to use carbon which remains neutral or alkaline despite an increased oxygen content. For this reason, carbon having the above-defined values of oxygen content and pH is used.

Though the precise structure and mechanism are not well understood, it is preferred to use carbon which is modified by attaching carboxyl, hydroxyl or ketone groups to a surface of carbon and substituting an alkali metal such as sodium for some of the hydrogen atoms of these groups.

Carbon is added in an amount so as to provide a desired resistance. Since an appropriate resistance for the charging member is a volume resistivity of about $10^2$ to $10^{12}$ Ωcm, the amount of carbon added is determined so as to provide a resistivity in this range. Usually 1 to 80 parts by weight of carbon is added per 100 parts by weight of the resin component.

The resin composition of which the outermost layer is made may further contain a thickener, thixotropic agent, structural viscosity imparting agent and other additives. They may be either inorganic or organic. Many aqueous fluorocarbon resins have a low viscosity and are rather difficult to form a thick coating. By adding such a thickener, thixotropic agent or structural viscosity imparting agent, it becomes possible to form a coating of aqueous fluorocarbon resin to any desired thickness.

The outermost layer comprising an aqueous fluorocarbon resin may have any desired thickness although a thickness of less than 30 μm, especially 0.1 to 15 μm is preferred. By coating to a thickness of less than 30 μm, there is obtained a flexible resin layer. Since coatings of more than 30 μm tend to crack, a problem of poor durability is added to the increased cost.

As previously mentioned, one of more intermediate layers are formed between the elastic layer and the outermost layer comprising an aqueous fluorocarbon resin as the case may be.

The intermediate layer(s) is formed of any desired resin other than the aqueous fluorocarbon resin. Examples of the resin include urethane resins, acrylic resins, polyester resins, urethane-modified acrylic resins, nylon resins, epoxy resins, styrene resins, butyral resins, and polyvinyl acetal resins. If the intermediate layer is in close contact with the elastic layer, an aqueous resin is preferably selected in order to ensure surface smoothness. Among these resins, the aqueous resins including acrylic resins, polyester resins and urethane resins are preferred.

Like the elastic layer and outermost layer, a conductive substance may be added to the intermediate layer to impart conductivity thereto. The conductive substance used herein is not critical and a choice may be made among those substances exemplified for the elastic and outermost layers. As in the outermost layer, it is desirable to use carbon having an oxygen content of at least 6%, more preferably at least 7%, most preferably at least 9% and at pH 5 or higher, more preferably pH 6 or higher, most preferably pH 7 or higher in case of the aqueous resin. The reason is the same.

The intermediate layer may have any desired thickness although a thickness of about 1 to about 600 μm is usually selected.

A dipping or spraying method may be used in forming the outermost and intermediate layers. The dipping method is, for example, by mixing selected components to form a coating solution and dipping the elastic layer or inside layer in the solution to form a coating.

The charging member of the invention preferably has a surface roughness of up to 4 μm, more preferably up to 3 μm, most preferably up to 2 μm as measured on JIS ten point mean roughness Rz scale at the surface of the outermost layer.

When an object is electrically charged by placing a charging member in contact with the object and applying voltage between the member and the object, the charging member of the invention is effective for providing a uniform supply of electric charge from the charging member to the object and preventing residual toner from depositing onto the charging member. Then satisfactory charging operation can be continued over a long period of time.

EXAMPLE

Examples of the present invention are given below by way of illustration and not by way of limitation.

Example 1

A charging roller was fabricated by forming an intermediate layer A of 160 μm thick on a conductive urethane foam roller (elastic layer) and an outermost layer M of 10 μm thereon. The intermediate layer A was formed by blending a water dispersible polyester resin with carbon SMP-4 to give a coating composition and dipping the roller therein. The outermost layer M was formed by blending a water dispersible fluorocarbon resin (polytetrafluoroethylene) with a polyvinyl acetal resin in a weight ratio of 9:1, adding carbon SMP-4 thereto to give a coating composition, and dipping the roller therein.

The intermediate layer A and outermost layer M were controlled to a volume resistivity of $8\times10^7$ Ωcm and $3\times10^9$ Ωcm, respectively, by adjusting the amount of carbon blended. It is noted that SMP-4 is a carbon having an oxygen content of 10% and pH 7.33. The roller had a surface roughness of 0.8 μm as measured on JIS ten point mean roughness Rz scale.

The roller was mounted in a printer, which was continuously operated at a temperature of 15° C. and a relative humidity of 10% to duplicate a character image on 4,000 sheets. Thereafter the roller was detached and observed for surface state to find little toner deposition and no geometric change of the outermost layer. The roller had a resistance of $8.0\times10^5$ Ω before printing operation and $8.1\times10^5$ Ω after printing operation, showing little change therebetween.

Example 2

A charging roller was fabricated by forming a first intermediate layer B of 40 μm thick on a conductive urethane foam roller (elastic layer), a second intermediate layer C of 125 μm thick thereon, and an outermost layer M of 10 μm thereon. The intermediate layer B was formed by blending a water dispersible polyester resin with carbon SMP-4 to give a coating composition and dipping the roller therein. The intermediate layer C was formed by blending a water dispersible urethane resin with carbon to give a coating composition and dipping the roller therein. The outermost layer M was formed using the same coating composition as in Example 1.

The intermediate layers B, C and outermost layer M were controlled to a volume resistivity of $4\times10^7$ Ωcm, $1\times10^8$ Ωcm, and $3\times10^9$ Ωcm, respectively, by adjusting the amount of carbon blended. The roller had a surface roughness Rz of 1.5 μm.

The roller was mounted in a printer, which was continuously operated at 15° C. and RH 10% to duplicate a character image on 4,000 sheets. Thereafter the roller was detached and observed for surface state to find little toner deposition and no geometric change of the outermost layer. The roller had a resistance of $8.2\times10^5$ Ω before printing operation and $8.3\times10^5$ Ω after printing operation, showing little change therebetween.

Example 3

A charging roller was fabricated as in Example 1 except that the coating composition for the outermost layer M further contained SBU-Isocyanate in a weight ratio of ¼ relative to the polyvinyl acetal resin whereby the resin layer M was crosslinked. The volume resistivity of the outermost layer M was similarly controlled. The roller had a surface roughness Rz of 1.0 μm.

The roller was mounted in a printer, which was continuously operated at 15° C. and RH 10% to duplicate a character image on 4,000 sheets. Thereafter the roller was detached and observed for surface state to find little toner deposition and no geometric change of the outermost layer. The roller had a resistance of $7.5\times10^5$ Ω before printing operation and $8.1\times10^5$ Ω after printing operation, showing little change therebetween.

Example 4

A charging roller was fabricated by forming an intermediate layer D of 150 μm thick on a conductive urethane foam roller (elastic layer) and an outermost layer N of 10 μm thereon. For the intermediate layer D was used a coating composition of a water dispersible polyester resin blended with carbon SMP-4. For the outermost layer N was used a coating composition of a water dispersible fluorocarbon resin (polytetrafluoroethylene) blended with carbon SMP-4.

The intermediate layer D and outermost layer N were controlled to a volume resistivity of $7\times10^7$ Ωcm and $1\times10^8$ Ωcm, respectively, by adjusting the amount of carbon blended. The roller had a surface roughness Rz of 1.0 μm.

The roller was mounted in a printer, which was continuously operated at 15° C. and RH 10% to duplicate a character image on 6,000 sheets and then character, halftone and black images. The printed images were acceptable.

Example 5

A charging roller was fabricated by forming a first intermediate layer E of 30 μm thick on a conductive urethane foam roller (elastic layer), a second intermediate layer F of 120 μm thick thereon, and an outermost layer P of 10 μm thereon. For the intermediate layer E was used a coating composition of a water dispersible polyester resin blended with carbon SMP-4. For the intermediate layer F was used a coating composition of an organic solvent-soluble urethane-modified acrylic resin blended with carbon. For the outermost layer P was used a coating composition of a water dispersible fluorocarbon resin (polytetrafluoroethylene) blended with carbon SMP-4.

The intermediate layers E, F and outermost layer P were controlled to a volume resistivity of $5\times10^7$ Ωcm, $1.2\times10^8$ Ωcm, and $3\times10^8$ Ωcm, respectively, by adjusting the amount of carbon blended. The roller had a surface roughness Rz of 1.2 μm.

The roller was mounted in a printer, which was continuously operated at 15° C. and RH 10% to duplicate a character image on 6,000 sheets and then character, halftone and black images. The printed images were acceptable.

Example 6

A charging roller was fabricated by forming an intermediate layer G of 300 μm thick on a conductive urethane foam roller (elastic layer) and an outermost layer M of 10 μm thereon. For the intermediate layer G was used a coating composition of a water dispersible acrylic resin blended with carbon SMP-4. The outermost layer M was formed using the same coating composition as in Example 1.

The intermediate layer G and outermost layer M were controlled to a volume resistivity of $1.5\times10^7$ Ωcm and $1\times10^8$ Ωcm, respectively, by adjusting the amount of carbon blended. The roller had a surface roughness Rz of 0.9 μm.

The roller was mounted in a printer, which was continuously operated at 15° C. and RH 10% to duplicate a character image on 4,000 sheets. Thereafter the roller was detached and observed for surface state to find little toner deposition and no geometric change of the outermost layer. The roller had a resistance of $9.5\times10^5$ Ω before printing operation and $1.0\times10^6$ Ω after printing operation, showing little change therebetween.

Example 7

A charging roller was fabricated by forming an intermediate layer G of 300 μm thick on a conductive urethane foam roller (elastic layer) and an outermost layer Q of 10 μm thereon. The intermediate layer G was formed using the same coating composition as in Example 6. The outermost layer Q was formed by mixing a water dispersible fluorocarbon resin (polytetrafluoroethylene), a vinylidene chloride copolymer latex and a polyvinyl acetal resin in a weight ratio of 7:2:1, adding carbon SMP-4 thereto to give a coating composition, and dipping the roller therein.

The intermediate layer G and outermost layer Q were controlled to a volume resistivity of $1.5\times10^7$ Ωcm and $1.5 \times 10^9$ Ωcm, respectively, by adjusting the amount of carbon blended. The roller had a surface roughness Rz of 0.9 μm.

The roller was mounted in a printer, which was continuously operated at 15° C. and RH 10% to duplicate a character image on 4,000 sheets. Thereafter the roller was detached and observed for surface state to find little toner deposition and no geometric change of the outermost layer. The roller had a resistance of $7.0 \times 10^5$ Ω before printing operation and $8.0 \times 10^5$ Ω after printing operation, showing little change therebetween.

Comparative Example 1

A charging roller was fabricated by forming an outermost layer H of 130 μm thick on a conductive urethane foam roller. For the outermost layer H was used a coating composition of an organic solvent-soluble urethane-modified acrylic resin blended with carbon 2400B.

The outermost layer H was controlled to a volume resistivity of $7.5 \times 10^7$ Ωcm by adjusting the amount of carbon blended. The roller had a surface roughness Rz of 9.1 μm.

The roller was mounted in a printer, which was continuously operated at 15° C. and RH 10% to duplicate a character image on 6,000 sheets and then character, half-tone and black images. Grained areas were found in the half-tone image. White skips were found in the black image. After the continuous printing operation, a considerable amount of toner deposited on the surface of the roller, especially in depressed areas.

Although some preferred embodiments have been described, many modifications and variations may be made thereto in the light of the above teachings. It is therefore to be understood that within the scope of the appended claims, the invention may be practiced otherwise than as specifically described.

We claim:

1. A charging member for electrically charging an object by placing the member in contact with the object and applying voltage between them, said member comprising an outermost layer formed from a coating composition containing an aqueous fluorocarbon resin as an emulsion, a suspension or a dispersion in a water medium and at least one second resin selected from the group consisting of a polyvinyl acetal resin, vinylidene chloride copolymer latex, a polyester resin, and an acrylic resin, wherein the second resin, other than the aqueous fluorocarbon resin in the outermost layer, is crosslinked by adding at least one third resin selected from the group consisting of an isocyanate resin, a melamine resin, a phenol resin, glyoxal, and an epoxy resin.

2. The charging member of claim 1 wherein said outermost layer has a thickness of less than 30 μm.

3. The charging member of claim 1 wherein said aqueous fluorocarbon resin occupies more than 60% by weight of a resin component in the outermost layer.

4. The charging member of claim 1 wherein said outermost layer further contains carbon.

5. The charging member of claim 4 wherein the carbon has an oxygen content of at least 6% and at least pH 5.

6. The charging member of claim 1 further comprising an elastic layer and an intermediate layer between the elastic layer and said outermost layer, wherein the intermediate layer contains carbon having an oxygen content of at least 6% and at least pH 5.

7. The charging member of claim 6 wherein said intermediate layer contains at least one resin selected from the group consisting of an acrylic resin, an urethane resin, a polyester resin, and an urethane-modified acrylic resin.

8. The charging member of claim 7 wherein said at least one resin in the intermediate layer is an aqueous resin.

9. The charging member of claim 1 further comprising an elastic layer comprised of foam.

10. The charging member of claim 1 having a surface roughness of up to 4 μm as measured on JIS ten point mean roughness Rz scale.

11. The charging member of claim 1 having a roller shape.

12. The charging member of claim 1 wherein said aqueous fluorocarbon resin is a dispersion of microparticulate polytetrafluoroethylene in water.

13. The charging member of claim 1 wherein said outermost layer further contains carbon having an oxygen content of at least 6% and at least pH 5.

14. A device for electrically charging an object, comprising a charging member adapted to be placed in contact with the object and means for applying voltage between the member and the object for electrically charging the object, said charging member comprising an outermost layer formed from a coating composition containing an aqueous fluorocarbon resin as an emulsion, a suspension or a dispersion in a water medium and at least one second resin selected from the group consisting of a polyvinyl acetal resin, a vinylidene chloride copolymer latex, a polyester resin, and an acrylic resin, wherein the second resin other than the aqueous fluorocarbon resin in the outermost layer, is crosslinked by adding at least one third resin selected from the group consisting of an isocyanate resin, a melamine resin, a phenol resin, glyoxal, and an epoxy resin.

15. The device of claim 14 wherein said outermost layer of the charging member has a thickness of less than 30 μm.

16. The device of claim 14 wherein said aqueous fluorocarbon resin occupies more than 60% by weight of a resin component in said outermost layer.

17. The device of claim 14 wherein said outermost layer of the charging member further contains carbon.

18. The device of claim 17 wherein the carbon has oxygen content of at least 6% and at least pH 5.

19. The device of claim 14 wherein the charging member further comprises an elastic layer and an intermediate layer between the elastic layer and said outermost layer, and said intermediate layer contains carbon having an oxygen content of at least 6% and at least pH 5.

20. The device of claim 19 wherein said intermediate layer of the charging member contains at least one resin selected from the group consisting of an acrylic resin, an urethane resin, a polyester resin, and a urethane-modified acrylic resin.

21. The device of claim 20 wherein said at least one resin in the intermediate layer is an aqueous resin.

22. The device of claim 14 wherein the charging member further comprises an elastic layer comprised of foam.

23. The device of claim 14 wherein the charging member has a surface roughness of up to 4 μm as measured on JIS ten point mean roughness Rz scale.

24. The device of claim 14 wherein the charging member has a roller shape.

25. The device of claim 14 wherein said aqueous fluorocarbon resin is a dispersion of microparticulate polytetrafluoroethylene in water.

26. The device of claim 14 wherein said outermost layer further contains carbon having an oxygen content of at least 6% and at least pH 5.

* * * * *